United States Patent
Bostick et al.

(10) Patent No.: US 9,875,451 B2
(45) Date of Patent: Jan. 23, 2018

(54) PREDICTIVE AND CORRECTIVE REPORTING OF VENUE OPERATING HOURS

(71) Applicant: International Business Machines Corporation, Armonk, NY (US)

(72) Inventors: James E. Bostick, Cedar Park, TX (US); John M. Ganci, Jr., Cary, NC (US); Richard Johnson, Raleigh, NC (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/937,185

(22) Filed: Nov. 10, 2015

(65) Prior Publication Data

US 2017/0132542 A1 May 11, 2017

(51) Int. Cl.
- *G06Q 10/06* (2012.01)
- *G06N 5/04* (2006.01)
- *G06Q 50/00* (2012.01)

(52) U.S. Cl.
CPC ......... *G06Q 10/06312* (2013.01); *G06N 5/04* (2013.01); *G06Q 50/01* (2013.01)

(58) Field of Classification Search
None
See application file for complete search history.

(56) References Cited

U.S. PATENT DOCUMENTS

| 8,768,867 | B1 | 7/2014 | Thaeler et al. | |
|---|---|---|---|---|
| 9,021,056 | B2 | 4/2015 | Dunn et al. | |
| 2012/0092492 | A1* | 4/2012 | Carbonell | G06Q 30/02 348/143 |
| 2012/0116789 | A1* | 5/2012 | Boss | G06Q 10/06 705/1.1 |
| 2015/0073709 | A1 | 3/2015 | Huang | |
| 2015/0172864 | A1* | 6/2015 | Fabrikant | H04W 4/023 455/456.1 |
| 2015/0178355 | A1* | 6/2015 | Christy | G06F 17/30241 707/746 |

OTHER PUBLICATIONS

Zhang et al, Wait Time Prediction: How to Avoid Waiting in Lines?, Sep. 2013, UbiComp '13 Adjunct Proceedings of the 2013 ACM conference on Pervasive and ubiquitous computing adjunct publication, pp. 481-490 (Year: 2013).*

* cited by examiner

*Primary Examiner* — Thomas L Mansfield
*Assistant Examiner* — Amanda K Gurski
(74) *Attorney, Agent, or Firm* — Heslin Rothenberg Farley & Mesiti P.C.

(57) ABSTRACT

A method includes obtaining, by one or more processor, a request related to an entity, data related to a given user, external data related to the entity, and external data related to the given user, and a record related to the entity, wherein the record comprises operating hours for the entity. The one or more processor analyzes the external data related to the entity and determines if there is an inconsistency in the operating hours, which it corrects. The processor analyzes the external data related to the entity to generate a prediction for peak hours of the entity and analyzes one or more of: the external data related to the entity, the external data related to the given user, the operating hours, the corrected operating hours, or the peak hours, to generate a recommendation for an optimal time for the given user to visit the entity.

17 Claims, 9 Drawing Sheets

| 610 | 600 |
|---|---|
| | Program code obtains a request related to an entity. |

| 620 | |
|---|---|
| | Program code obtains external data related to the entity. |

| 630 | |
|---|---|
| | Program code analyzes the historical data to generate a prediction for when the entity will be busiest during a given time. |

| 640 | |
|---|---|
| | Program code notifies the user of the prediction. |

Program code obtains a request for related to an entity and data related to the given user that indicates personal preferences of the given user.

820

Program code obtains external data related to the entity and external data related to the given user.

830

Program code 440 obtains a record related to the entity that includes operating hours for the entity.

840

Program code corrects the operating hours to generate corrected operating hours.

850

Program code analyzes the external data related to the entity to generate a prediction for peak hours of the entity.

860

Program code analyzes one or more of: the external data related to the entity, the external data related to the given user, the operating hours, the corrected operating hours, or the peak hours and generates a recommendation for an optimal time for a given user to visit the entity.

870

Program code notifies the given user of at least one of: the operating hours, the corrected operating hours, the peak hours, or the recommendation.

FIG. 8

Family Restaurant
10 Main St.
Springfield, MA 12345

Open Today: 11am-~~10pm~~ 11pm
Peak Hours: 7pm-8pm
Recommended Hours: 8:30pm-10pm

FIG. 9

PREDICTIVE AND CORRECTIVE REPORTING OF VENUE OPERATING HOURS

TECHNICAL FIELD

One or more aspects of the present invention relate to the automated utilization and analysis of multiple data source to produce an accurate representation of optimum operating hours for an establishment.

BACKGROUND

Through various software applications, including installed clients as well as thin clients, such as web browsers, digital mapping services generate and display dynamic adjusted operating hours for establishments, including but not limited to retail stores, restaurants, and bars. These services offer the opening times of the business on the day that the application is queried (i.e., "today") and a current opening status (e.g., Open now, Closed now, Closing soon). However, this information is often inaccurate, leading potential visitors to erroneously visit closed businesses at time when the application listed the business as being open. Reasons for these inaccuracies include unreported changes in operating hours, a scheduling change necessitated by a holiday, and/or a temporary closure.

SUMMARY

Shortcomings of the prior art are overcome and additional advantages are provided through the provision of a method of producing enhanced data related to the operating hours of an entity. The method includes, for instance: obtaining, by one or more processor, a request related to an entity and data related to a given user, wherein the data related to the given user indicates personal preferences of the given user; obtaining, by the one or more processor, external data related to the entity and based on the data related to the given user, external data related to the given user, wherein the external data is located on at least one computer resource communicatively coupled to the one or more processor; obtaining, by the one or more processor, a record related to the entity, wherein the record comprises operating hours for the entity; analyzing, by the one or more processor, the external data related to the entity and based on comparing a portion of the external data to the record, determining if there is an inconsistency in the operating hours; based on determining that there is an inconsistency in the operating hours, correcting, by the one or more processor, the operating hours to generate corrected operating hours; analyzing, by the one or more processor, the external data related to the entity to generate a prediction for peak hours of the entity; and analyzing, by the one or more processor, one or more of: the external data related to the entity, the external data related to the given user, the operating hours, the corrected operating hours, or the peak hours, to generate a recommendation for an optimal time for the given user to visit the entity.

Shortcomings of the prior art are overcome and additional advantages are provided through the provision of a computer program product to produce enhanced data related to the operating hours of an entity. The computer program product includes, for instance a computer readable storage medium readable by one or more processor and storing instructions for execution by the one or more processor for performing a method that includes: obtaining, by the one or more processor, a request related to an entity and data related to a given user, wherein the data related to the given user indicates personal preferences of the given user; obtaining, by the one or more processor, external data related to the entity and based on the data related to the given user, external data related to the given user, wherein the external data is located on at least one computer resource communicatively coupled to the one or more processor; obtaining, by the one or more processor, a record related to the entity, wherein the record comprises operating hours for the entity; analyzing, by the one or more processor, the external data related to the entity and based on comparing a portion of the external data to the record, determining if there is an inconsistency in the operating hours; based on determining that there is an inconsistency in the operating hours, correcting, by the one or more processor, the operating hours to generate corrected operating hours; analyzing, by the one or more processor, the external data related to the entity to generate a prediction for peak hours of the entity; and analyzing, by the one or more processor, one or more of: the external data related to the entity, the external data related to the given user, the operating hours, the corrected operating hours, or the peak hours, to generate a recommendation for an optimal time for the given user to visit the entity.

Computer systems and methods relating to one or more aspects of the technique are also described and may be claimed herein. Further, services relating to one or more aspects of the technique are also described and may be claimed herein.

Additional features and are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

FIG. 6 depicts a workflow that illustrates aspects of an embodiment of the present invention;

FIG. 8 depicts a workflow that illustrates aspects of an embodiment of the present invention; and FIG. 9 is an example of a notification in an embodiment of the present invention.

DETAILED DESCRIPTION

Figure 1:
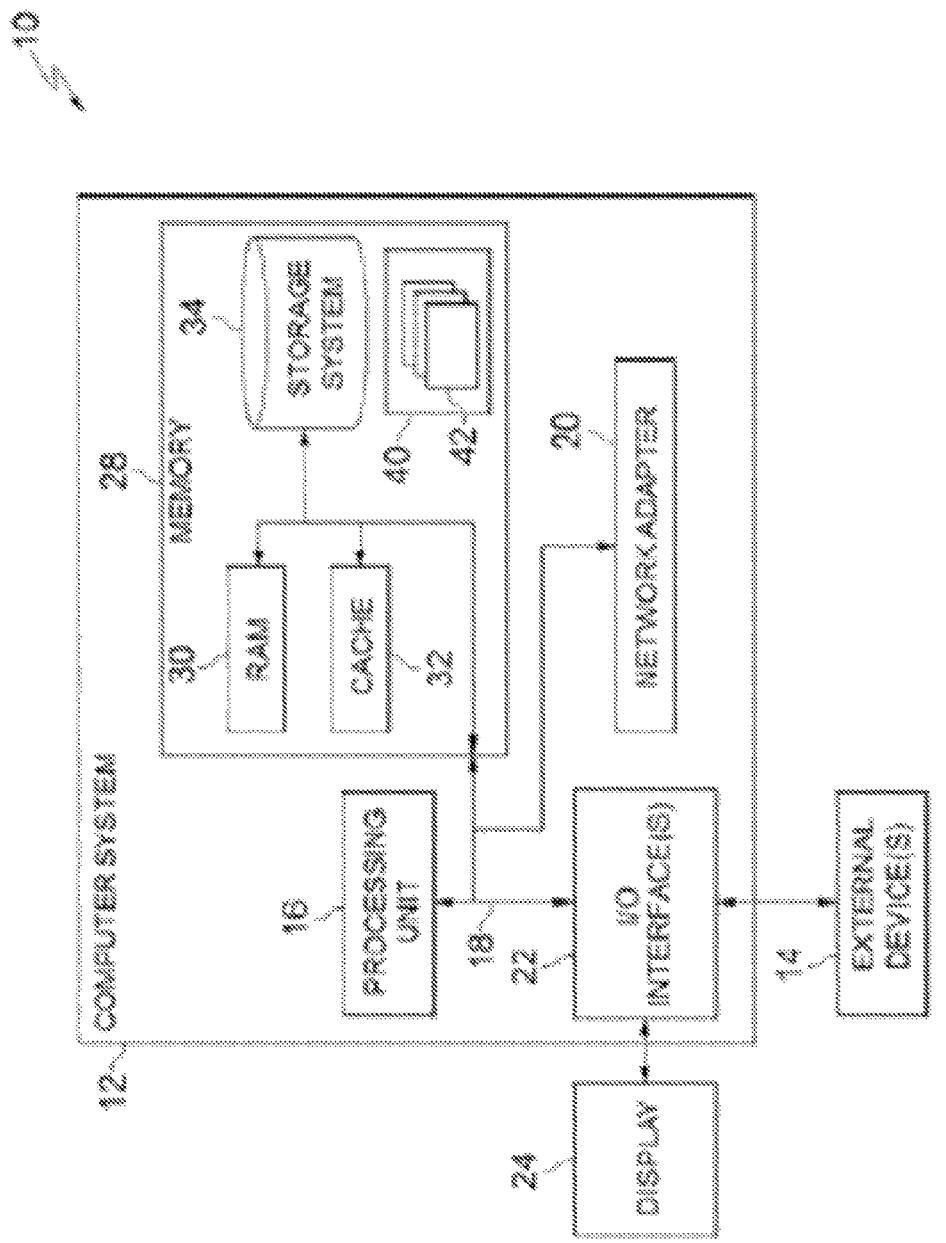
FIG. 1 depicts a cloud computing node, in accordance with one or more aspects set forth herein.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

Embodiments of the present invention include systems and methods that increase the accuracy of data analysis and reporting related to generating an accurate representation of the operating hours of a given establishment. Embodiments of the present invention may include one or more program 440 (described in FIG. 4) to verify operating hours for an establishment. Embodiments of the present invention may also include one or more program 440 to generate a prediction for when the establishment will be busiest during a given time. Embodiments of the present invention may also include one or more program 440 to generate a recommendation for an optimal time and/or time range, for a given user to visit the establishment.

For ease of understanding, portions of this disclosure illustrate aspects of certain embodiments of the present invention as they apply to the operating hours of commercial businesses, including but not limited to, restaurants and retail outlets. But as understood by one of skill in the art, aspects of certain embodiments of the present invention can be applied to any temporal situation where one or more of operation times, traffic (including both traffic to a location and traffic within the location), and/or attendance, are dynamic. For example, in an embodiment of the present invention one or more program 440 may verify the operating hours of a given ride at an amusement park. This one or more program 440 may also generate a prediction for when the wait time for the ride may be longest and/or shortest. This one or more program 440 may generate a recommendation of an optimal time and/or time range, for a given user to visit the ride.

Aspects of certain embodiments of the present invention represent improvements to computer-related technology by leveraging electronic data analyses, including automated methods of data review and incorporating into this analysis, data that is exclusive to computing technologies, to provide more efficiently and accurately, to a user of a computing resource, in a multi-user environment, information of greater accuracy than could gleaned from resources outside of the computing environment. In the present invention, not only does the one or more program 440 perform data analysis more effectively because the analysis itself leverages the processing advantages of the computer system upon which it is executed, but the data that informs the analysis and informs the results of the system and method described are inextricably tied to computer technology. For example, as will be described in greater detail herein, in certain embodiments of the present invention, one or more program 440 verifies automated operating hours on an establishment by identifying potential inconsistencies in recorded operating hours for a business through one or more of: Natural Language Processing, social network check-ins, and/or automated direct contact. In an embodiment of the present invention, one or more program 440 may generate a prediction for peak hours for a given establishment based on one or more of the following: historical social network check-ins, and/or Natural Language Processing. In an embodiment of the present invention, one or more program 440 may generate a recommendation for optimal hours for a given user to visit an establishment based on one or more of: social network check-ins, and/or sentiment analysis.

In addition to the advantages offered by embodiments of the present invention that are specific to improvements in computer-related technology, certain embodiments of the present invention may also offer advantages to users that will encourage utilization of these embodiments, thus, encouraging users to access improved computing technologies. For example, embodiments of the present invention offer advantages to local businesses who can better attract customers at hours when an establishment is open for business. Embodiments of the present invention may improve a visitor's experience when visiting that business by directing the visitors to avoid or attend at peak hours. Embodiments of the present invention may improve visiting experiences for specific users at specific establishments by identifying times that these users should visit that are customized to their preferences.

Advantages of certain embodiments of the present invention may be realized in multi-user and multi-entity computing environments. In an embodiment of the present invention, the type of data that can be obtained and analyzed by the one or more program 440 is enhanced by the connectivity of a computer resource, illustrated by computing node 10 (FIG. 4) utilized by a user accessing an embodiment of the present invention. One computing environment in which advantages of certain embodiments can be realized is a cloud computing environment. In embodiments of the present invention one or more program 440 executing on a resource of a cloud could obtain and analyze crowd sourced data as part of an historical data analysis to determine peak hours and/or personalized recommendations, for a given establishment. Crowd-sourced data available in this computing environment may include global positioning system (GPS) data gathered from mobile device users utilizing cloud computing services. In an embodiment of the present invention, one or more program 440 executing on a cloud resource or on a resource accessible to a cloud resource could upload GPS data anonymously to a cloud-based server and analyze trends in this data.

FIGS. 1-4 depict various aspects of computing, including cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, mobile devices, personal data assistants, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in cloud computing node 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
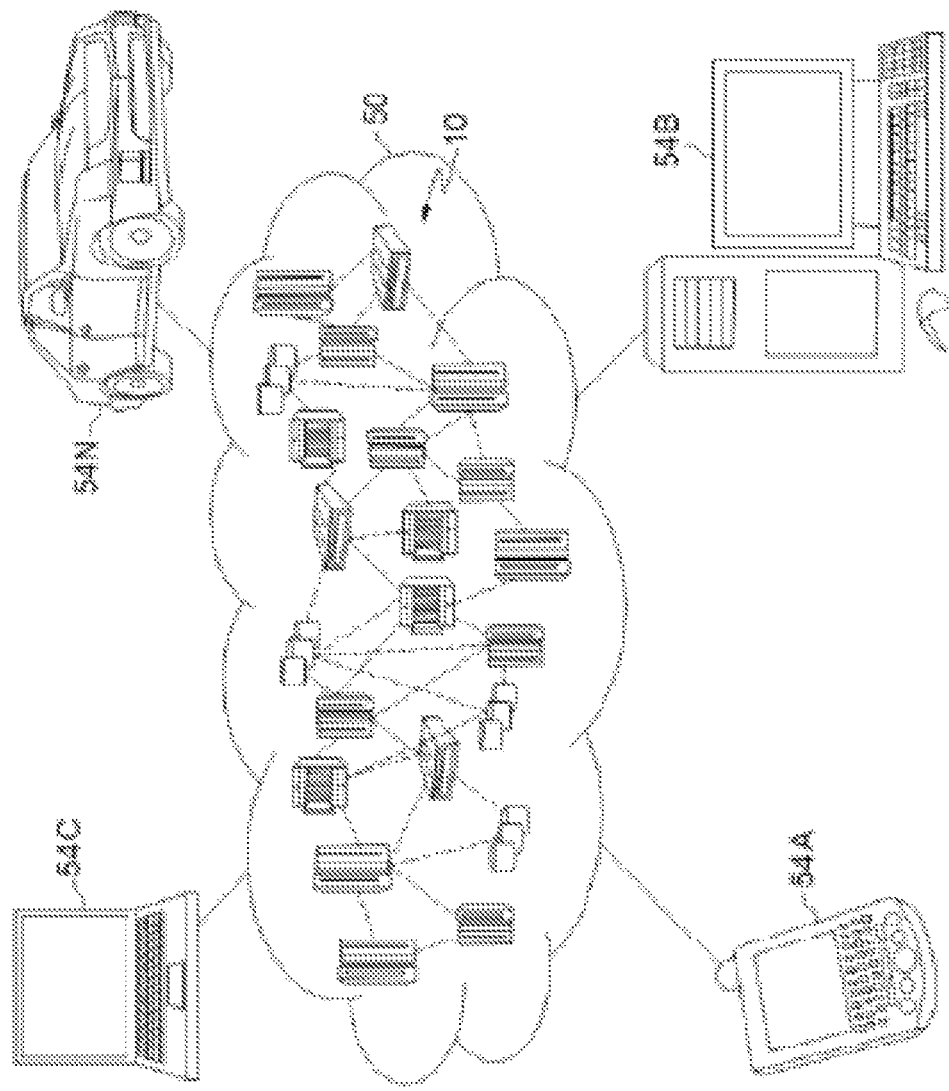
FIG. 2 depicts a cloud computing environment, in accordance with one or more aspects set forth herein.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
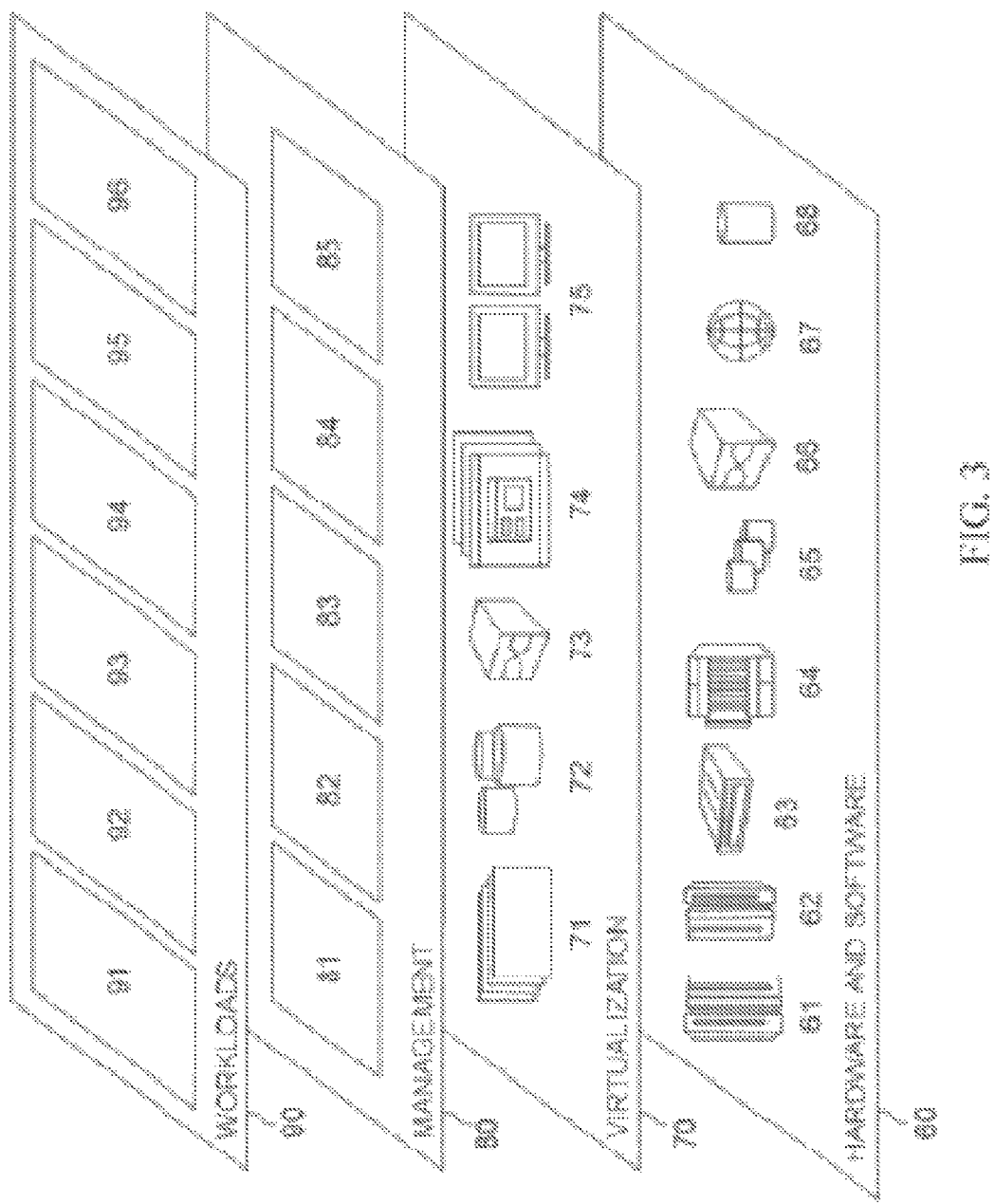
FIG. 3 depicts abstraction model layers, in accordance with one or more aspects set forth herein.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and producing an accurate representation of optimum operating hours for an establishment 96, as described herein. Element 96 can be understood as one or more program 440 described in FIG. 4.

Figure 4:
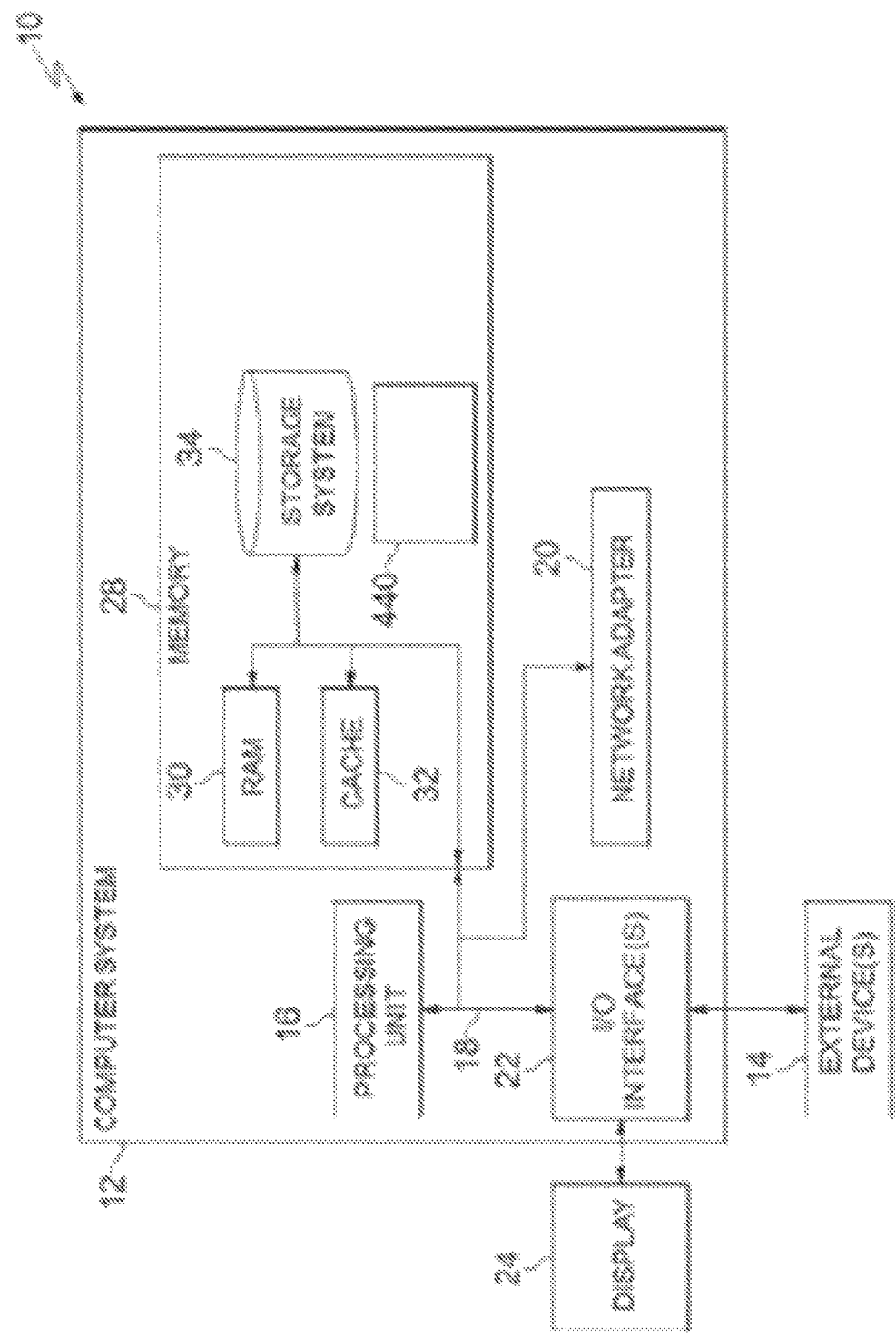
FIG. 4 depicts a hardware overview of a computing node, in accordance with one or more aspects of the present invention.

FIG. 4 depicts a hardware overview of a computing node 10, in accordance with one or more aspects set forth herein.

Program/utility 40 as set forth in FIG. 1 can include one or more program 440 as set forth in FIG. 4, and program/utility 40, including, for example one or more program 440 to evaluate the efficacy of the communications between one or more entities when transferring task ownership between these entities, as described in work layer 96. Program/utility 40 as set forth in FIG. 1 can optionally include additional programs.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 generally carry out the functions and/or methodologies of embodiments of the invention as described herein.

Referring again to FIG. 4:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
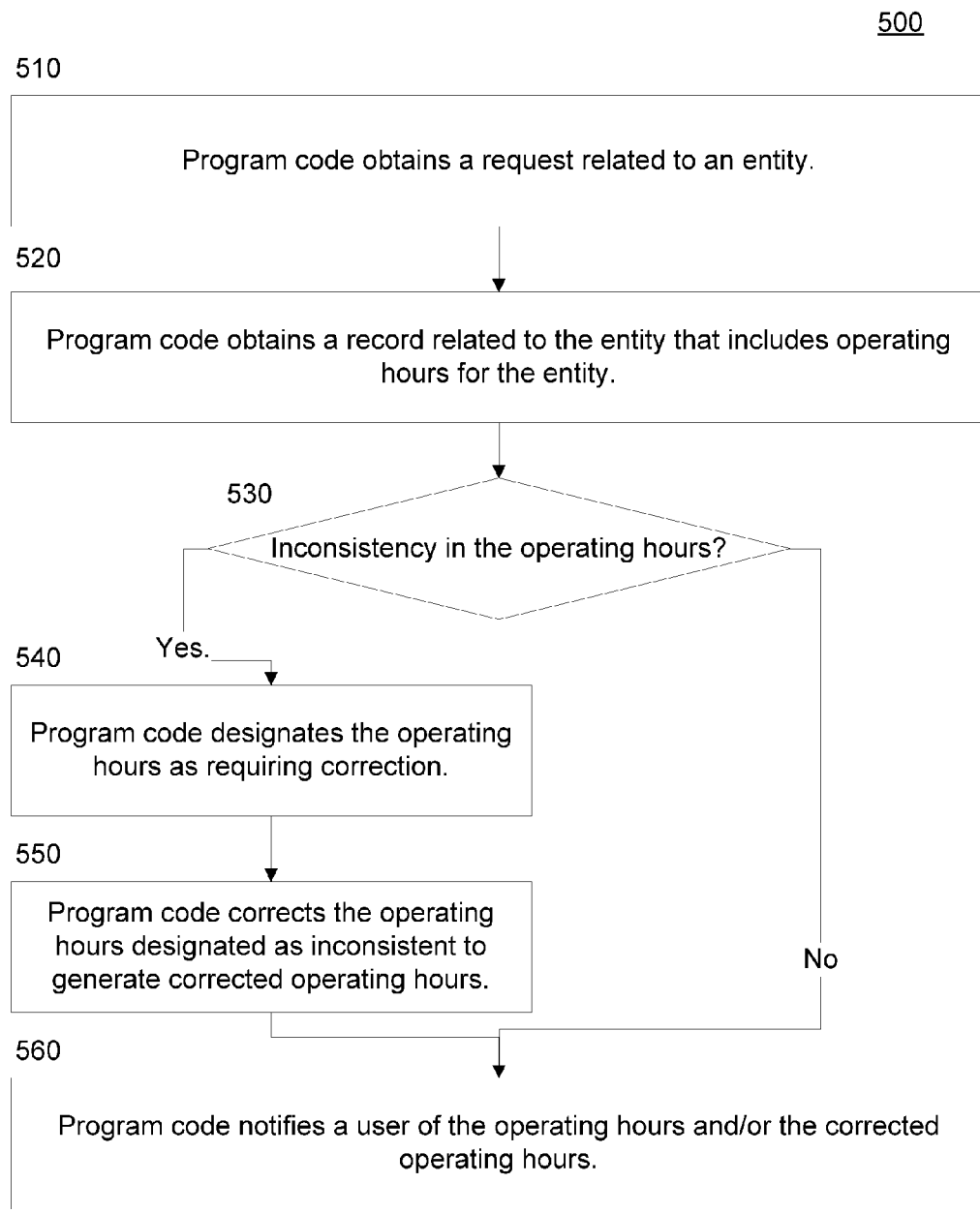
FIG. 5 depicts a workflow that illustrates aspects of an embodiment of the present invention.
Figure 7:
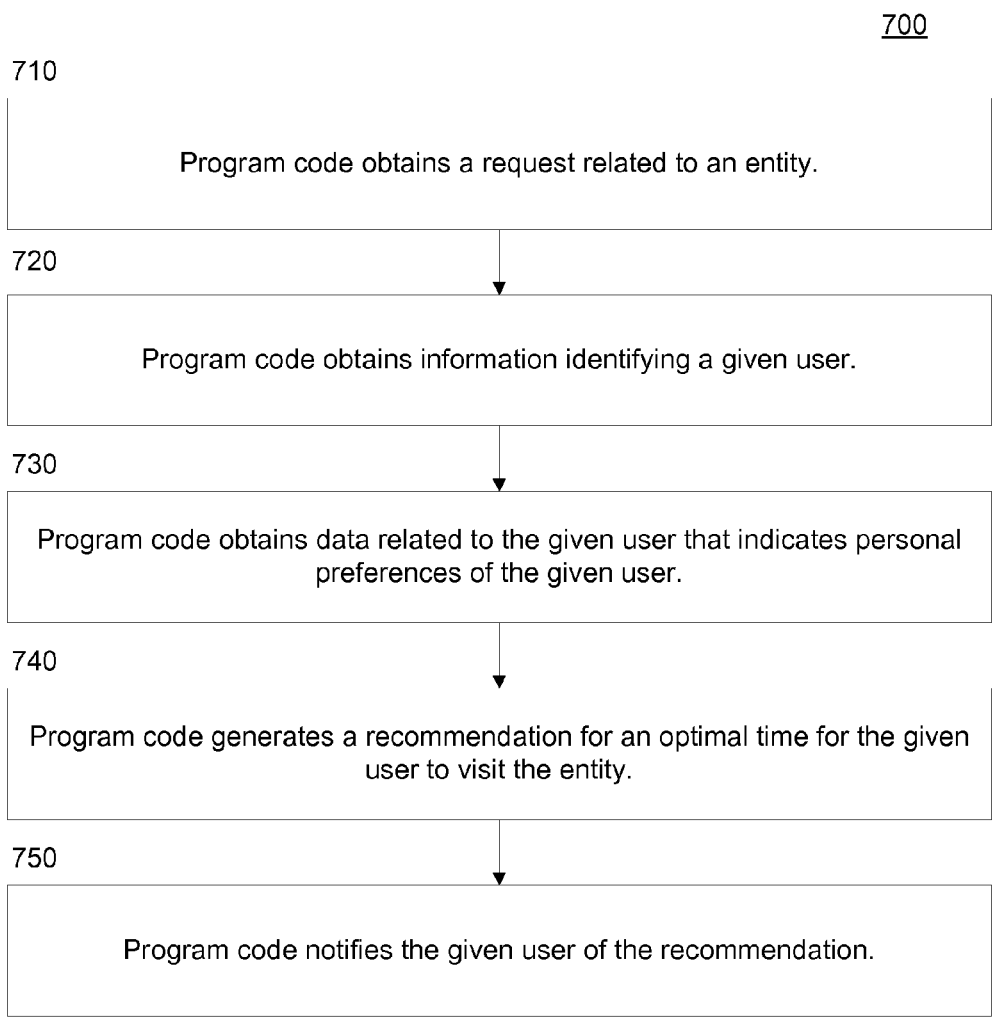
FIG. 7 depicts a workflow that illustrates aspects of an embodiment of the present invention.

FIGS. 5-8 depicts a workflows 500, 600, 700, 800 incorporating various aspects of certain embodiments of the present invention. FIG. 5 depicts a workflow 500 that illustrates aspects of an embodiment of the present invention where one or more program 440 verifies operating hours for an establishment. FIG. 6 depicts a workflow 600 that illustrates aspects of an embodiment of the present invention where one or more program 440 generates a prediction for when the establishment will be busiest during a given time. FIG. 7 depicts a workflow 700 that illustrates aspects of an embodiment of the present invention where one or more program 440 generates a recommendation for an optimal time and/or time range, for a given user to visit the establishment. These workflows are depicted separately for ease of understanding and one or more of the workflows may be incorporated into a given embodiment of the present invention. FIG. 8 depicts an example of a workflow 800 in an embodiment of the present invention that combines aspects of the workflows of FIGS. 5-7.

Referring first to FIG. 5, one or more program 440 (FIG. 4) obtains a request related to an entity (510). As described earlier, an entity includes any temporal situation where one or more of operation times, traffic (including both traffic to a location and traffic within the location), and/or attendance, are dynamic. Entities include, but are not limited to, establishments, such as commercial businesses, a restaurant, and retail location (stores, outlets).

Based on obtaining the request related to the entity, the one or more program 440 obtains a record related to the entity that includes operating hours for the entity (520). The one or more program 440 may obtain this record from a local memory resource, such as memory 28 (FIG. 4), and/or from a resource accessible by one or more processor executing the one or more program 440 via a communications connection. For example, the one or more program 440 may query a resource to locate a web page for the entity and analyze the text on the web page of the entity to obtain the operating hours. In an embodiment of the present invention, the operating hours obtained are for a given day and/or time period, as designated by the request and/or a predefined process.

Upon obtaining the operating hours, the one or more program 440 determines if there is an inconsistency in the operating hours (530). In an embodiment of the present invention, the one or more program 440 analyzes the starting value for the operating hours, and ending value for the operating hours, and/or any values within the range between the starting value and the ending value to determine whether there is an inconsistency. In an embodiment of the present invention, the one or more program 440 analyzes various forms of digital data available over a communications connection to the one or more processor executing the one or more program 440. For example, the one or more program 440 may query operating hours listed for the entity on various publicly accessible websites. As part of the determining, the one or more program 440 may analyze of historical social network check-ins for the entity. In this example, a check-in time on a social network at a time outside of the operating hours range may indicate an inconsistency. In an embodiment of the present invention, the one or more program 440 determines that there is an inconsistency based on information that is external to the resources of a computing node 10 executing the one or more program 440.

In an embodiment of the present invention, rather than obtain and evaluate operating hours based on obtaining a request, the one or more program 440 may perform these activities automatically in accordance with a pre-configured schedule. For example, the one or more program 440 may periodically analyze operating hours held on an accessible record for a given entity and search for external information that is inconsistent with these operating hours.

Returning to FIG. 5, based on the one or more program 440 determining that there is no inconsistency, the one or more program 440 notifies a user of the operating hours (560). In an embodiment of the present invention, the one or more program 440 may notify the user of the operating hours utilizing one of more of the following methods: displaying the operating hours in a graphical users interface, sending the user a text message, placing a voice call to the user, sending the user an email, and/or sending the user another type of electronic message.

Alternatively, based on the one or more program 440 determining that there is an inconsistency, the one or more program 440 designates the operating hours as requiring correction (540). In an embodiment of the present invention, the one or more program 440 may indicate that correction of the operating hours for an entity is needed by retaining the obtained operating hours in a memory and setting an indicator in the record to indicate that the one or more program 440 determined that there is an inconsistency.

In an embodiment of the present invention, the one or more program 440 corrects the operating hours designated as inconsistent to generate corrected operating hours (550). In order to correct the operating hours, the one or more program 440 obtains data related to the entity that may indicate the actual operating hours. For example, the one or more program 440 may analyze historical social network check-in data for the entity, including, but not limited to data indicating when a significant number of check-ins occur. For example, if the operating hours for a given entity indicate a closing time of 10 pm and the historical check-in data for the entity indicates a significant number of check-ins occur between 10-11 pm on Monday nights, the one or more program 440 can determined that the operating hours of the entity extend to 11 pm. In an embodiment of the present invention, the one or more program 440 utilizes Natural Language Processing (NLP) to correct the operating hours of the entity. For example, the one or more program 440 can perform a search for operating hours on an entity's web site, social channels, email newsletter, etc. to locate instances of quoted operating hours and compare this range with the operating hours designated as inconsistent. In an embodiment of the present invention, the one or more program may send an automated email, informing the entity of an inconsistency and requesting updated operating hours. For example, the one or more program 440 may generate an email stating, "Our system detects a significant number of social network check-ins at your location outside of the operating hours we have listed for your establishment. Please confirm the current operating hours." Upon receiving a reply, the one or more program 440 may perform an NLP on the replay message to extract corrected operating hours.

Upon correcting the operating hours of the entity, in an embodiment of the present invention, the one or more program 440 notifies a user of the operating hours and/or the corrected operating hours (560). The one or more program 440 may notify the user of the operating hours utilizing one of more of the following methods: displaying the operating hours in a graphical users interface, sending the user a text message, placing a voice call to the user, sending the user an email, and/or sending the user another type of electronic message.

Referring now to FIG. 6, in an embodiment of the present invention, the one or more program 440 generates a prediction for when the establishment will be busiest during a given time. The busy period may be referred to as peak hours, which indicate the busiest time for a given entity on a given day. In an embodiment of the present invention, the one or more program 440 utilizes historical records to generate the prediction of when the entity will experience peak hours on a given day.

In an embodiment of the present invention, one or more program 440 (FIG. 4) obtains a request related to an entity (610). The one or more program 440 obtains external data related to the entity (620). The one or more program 440 analyzes the historical data to generate a prediction for when the entity will be busiest during a given time (630). Upon generating this prediction, the one or more program 440 may notify the user of the prediction (640). For example, the one or more program 440 may notify the user of peak hours by utilizing one of more of the following methods: displaying the operating hours in a graphical users interface, sending the user a text message, placing a voice call to the user, sending the user an email, and/or sending the user another type of electronic message. In an embodiment of the present invention, the one or more program 440 may determine the content of the notification based on the request. For example, if the request relates to the operating hours of an entity on a given day, the notification may contain the peak hours for the day of the week upon which the given day falls.

Returning to FIG. 6, in an embodiment of the present invention, the one or more program 440 generates a prediction for when the establishment will be busiest during a given time (620) based on analyzing external data, which includes historical social network check-ins and/or NLP. Analysis of historical data and NLP are two non-limiting examples of analyses of external data that the one or more program 440 may utilize to determine peak hours for a given entity.

In an embodiment of the present invention, the one or more program 440 may analyze the external data it obtained, including historical social network check-ins to determine peak hours for an entity, for example, by retrieving social network check-ins from previous days that indicate a peak in check-ins at certain hours of certain days. Based on this check-in information, the one or more program 440 can determined that the peak time for that certain day is during those certain hours.

In an embodiment of the present invention, the one or more program 440 may utilize NLP to determine peak hours for a given entity. In an embodiment of the present invention, the one or more program 440 may apply NLP to the external data. For example, the one or more program may access the entity's web site, social channels, social network, status messages, email newsletters, etc. to locate future events that may affect attendance, and adjust the prediction based on anticipated attendance at these events. For example, data processed for a venue may indicate a plan for live entertainment at a given time on a given night related to the request. The one or more program 440 can determine that this event will impact attendance and adjust anticipated peak hours to reflect attendance at this event.

Turning now to FIG. 7, which as aforementioned, depicts a workflow 700 in which one or more program 440 generates a recommendation for an optimal time and/or time range, for a given user to visit the establishment, in an embodiment of the present invention. In an embodiment of the present invention, one or more program 440 (FIG. 4) obtains a request related to an entity (710). The one or more program 440 also obtains information identifying a given user (720). In an embodiment of the present invention, the information may be part of the request. In an embodiment of the present invention, the request includes information specifying a time period. The time period may be a desired time period in which the given user hopes to visit the entity.

In an embodiment of the present invention, the one or more program 440 obtains data related to the given user that indicates personal preferences of the given user (730). The one or more program 440 utilizes these data, for example, in identifying the given user's preference for when to visit a given entity. This data may include, but is not limited to historical social network check-ins, including but not limited to when the user has visited the entity, which may be a given venue, or an entity that is similar to it in the past. The one or more program 440 may obtain from this historical data the user's preferred time for visiting a type of entity that is similar to the entity related to the request. The data may also include data obtained by the one or more program 440 through a sentiment analysis. A sentiment analysis indicates the times of day that the user has had a positive or negative experience at a specific venue (i.e., entity) (or one similar to it) in the past. From a sentiment analysis, the one or more program 440 may determine that a given user enjoys certain eating establishments when they are busy, but prefers the shortest wait when visiting an automobile repair establishment for an oil change.

Returning to FIG. 7, based on the data obtained, the one or more program 440 generates a recommendation for an optimal time for a given user to visit the entity (740). In an embodiment of the present invention, the one or more program 440 may generate a recommendation for an optimal time for the given user on a given day. In an embodiment of the present invention, to generate the recommendation, the one or more program 440 selects personalized optimum hours for the user to visit the entity. Because the one or more program 440 has established the user's preferences, the one or more program 440 can recommend when the optimum time to visit a venue will be for that individual. For example, through sentiment analysis, the one or more program 440 may determine that a given user prefers to visit an eating establishment when live entertainment is scheduled for that time. In this example, the one or more program 440 obtains this data and when it determines, for example, by executing an NLP process on the web site of the entity, that live entertainment is scheduled at the entity, which is an eating establishment, the day of the request, the one or more program 440 generates a recommendation that includes the time that the live entertainment is scheduled. In another example, if the one or more program 440 obtains, through sentiment analysis, data that indicates that the given user prefers to visit entities similar to the entity when they are most busy, the one or more program 440 generates a recommendation that includes the peak hours at the entity.

Returning to FIG. 7, the one or more program 440 notifies the given user of the recommendation (750). In an embodiment of the present invention, the one or more program 440 may notify the user of the recommendation utilizing one of more of the following methods: displaying the operating hours in a graphical users interface, sending the user a text message, placing a voice call to the user, sending the user an email, and/or sending the user another type of electronic message.

As aforementioned, FIG. 8 depicts a workflow 800 that combines various aspects of the workflows of FIGS. 5-7, to illustrate an embodiment of the present invention. Referring to FIG. 8, in the illustrated embodiment, one or more program 440 (FIG. 4) obtains a request related to an entity and data related to the given user that indicates personal preferences of the given user (810). The one or more program 440 obtains external data related to the entity and external data related to the given user (820). The one or more program 440 obtains a record related to the entity that includes operating hours for the entity (830). The one or more program 440 analyzes external data related to the entity and based on comparing a portion of the external data to the record, determines if there is an inconsistency in the operating hours (840). Based on determining that there is an inconsistency, the one or more program 440 corrects the operating hours to generate corrected operating hours (840). The one or more program 440 analyzes the external data related to the entity to generate a prediction for peak hours of the entity (850). The one or more program 440 analyzes one or more of: the external data related to the entity, the external data related to the given user, the operating hours, the corrected operating hours, or the peak hours and generates a recommendation for an optimal time for a given user to visit the entity (860). The one or more program 440 notifies the given user of at least one of: the operating hours, the corrected operating hours, the peak hours, or the recommendation (870).

FIG. 9 is an example of a notification from the one or more program 440 in an embodiment of the present invention. This notification includes the operating hours, the corrected operating hours, the peak hours, and the recommendation. As seen in FIG. 9, the operating hours that the one or more program 440 obtained from one or more record indicated that the entity, Family Restaurant, was open from 11 am-10 pm, on the day upon which the one or more program 440 received the request. The corrected hours, as noted, are 11 am-11 pm, which are displayed by the one or more program 440. The recommendation of the one or more program 440 for the given user is 8:30 pm-10 pm, which the one or more program 440 has displayed.

As aforementioned, although the advantages of embodiments of the present invention may be realized prominently when applied to enhancing a client's understanding of the operating hours of a commercial establishment, such as a restaurant or a retail location, embodiments of the present invention may be utilized in any temporal situation where operation times and traffic attendance are dynamic. For example, an embodiment of the present invention may be utilized in reference to an attraction at an amusement park. Utilizing this example, the one or more program 440 (FIG. 4) verifies the operating hours by using historical data, including pictures posted on social media, social check-ins, and GPS activity tracking to determine when the attraction is predicted to be operational. The one or more program 440 generates a prediction for peak hours of the attraction by determining when wait times for the attraction will be longest today, based on factors such as predicted park attendance, historical wait times on days with similar characteristics, NLP of competing attractions (e.g., if there is a 3 pm parade on a given day included in the request, the attraction may have a shorter wait time as people move away to watch the parade). Finally, the one or more program 440 generates a recommendation for an optimal time for a given user based upon the formerly determined expected wait times, personal preferences of the given user (e.g., an historical analysis may indicate that the given user has a preference is for high speed roller coasters, and based on this preference, the one or more program 440 recommends a time to visit when the attraction, a high speed roller coaster, when other high speed roller coasters in the vicinity have the shortest wait time).

External factors, referred to also as external data, obtained by the one or more program 440, aid the one or more program 440 in generating a prediction for when an entity will be busiest during a given time and generating a recommendation for an optimal time for a given user to visit the entity. As illustrated in FIGS. 6-8, in embodiments of the present invention, one or more programs 440 utilizes a variety of predictive analytics to predict when an entity (e.g., a location) is expected to be busiest. By applying these analytics, the one or more program 440 can detect the influence of external factors that could lead to a spike or drop in traffic that are not otherwise available from historical data. For example, by using NLP, which is inextricably tied to computer technology, in an embodiment of the present invention, the one or more program 440 learns that a restaurant is featured in a Best of The City Restaurant Week and therefore should expect high traffic all week. The one or more program 440 may also obtain external factors that could change the optimal hours for a given user to visit a location. For example, utilizing NLP, the one or more program 440 learns a local bar is featuring the local sports team on Monday Night Football one a given night. When the user's preferences are for a quiet drink, and the bar is typically quiet on Monday nights, the one or more program 440 will take into account that the football game is expected to draw a large crowd and generate a recommendation to the user to visit the bar before or after the game is played.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
   determining, by one or more processor, in a dynamic temporal timeframe, based on obtaining an inquiry from a remote computing device of a given user, a recommendation for a user customized time for the given user to visit an entity, a corrected range of business hours for the entity, and peak hours of the entity, the determining comprising:

providing, by one or more processor, a graphical user interface on the remote computing device for entry of a request related to an entity with a temporal parameter and data related to a given user, wherein the given user is a user utilizing the remote computing device via the graphical user interface;

obtaining, by the one or more processor, over an Internet connection, from the remote computing device via the entry in the graphical user interface, the request related to the entity, wherein the request comprised the inquiry, and the data related to the given user, wherein the data related to the given user indicates personal preferences of the given user;

transmitting, over a network communication channel to at least one computer resource of in a multi-user environment communicating with the one or more processor over an Internet connection, at least one query related to the temporal parameter of the entity, wherein the multi-user environment comprises at least one node of a cloud computing system;

responsive to the at least one query, obtaining, by the one or more processor, from a variety of data sources remote from the entity accessible to the least one computer resource, based on the remote computing device sharing the at least one computer resource with other mobile devices in the a multi-user environment, accessible to the remote computing device and the other mobile devices over the Internet, the variety of data sources comprising at least one social networking website, external data related to the temporal parameter of the entity, and based on the data related to the given user, external data related to the given user, wherein the external data related to the entity further comprises global positioning system data gathered from the other mobile devices utilizing services of the cloud computing system and uploaded to a cloud-based server accessible in the cloud computing system to the one or more processor;

obtaining, by the one or more processor, from a memory resource communicatively coupled to the one or more processor, a record of a proposed range for the temporal parameter related to the entity, wherein the proposed range comprises operating hours for the entity;

executing, by the one or more processor, on the external data related to the entity, natural language processing algorithms, based on machine learning, to analyze the external data related to the entity, wherein the executing comprises analyzing trends in the global positioning system data, and based on the natural language processing algorithms, inferring data points from the external data related to the entity that are both consistent and inconsistent with the proposed range;

based on inferring at least one data point that is inconsistent with the proposed range, generating, by the one or more processor, a corrected value comprising operating hours by adjusting the proposed range to include the one or more data points, and replacing the proposed range for the entity in the memory resource with the corrected range;

analyzing, by the one or more processor, the data points related to the entity to generate a prediction for peak hours of the entity;

executing, by the one or more processor, on the external data related to the given user, natural language processing algorithms, based on machine learning, to infer data related to past behaviors of the given user relevant to the given user visiting the entity and determining, based on the inferred data, the corrected range, the prediction for peak hours, and the recommendation for the user customized time for the given user to visit the entity, wherein the corrected range comprises the user customized time and the user customized time is less than the corrected range, wherein the user customized time is customized to the given user based in part on historical preferences of the given user, wherein the external data related to the entity comprises historical data related to the given user, and wherein the historical preferences of the given user are determined based on the executing the natural language processing algorithms on the external data related to the entity;

transmitting, by the one or more processor, over an Internet connection, to the given user via the remote computing device, the recommendation, the corrected range, and the peak hours; and displaying, the recommendation, the corrected range, and the peak hours, in the graphical user interface.

2. The method of claim 1, wherein the obtaining external data related to temporal parameter of the entity comprises:
obtaining and analyzing digital crowd-sourced data accessible to the one or more processor over a communications connection.

3. The method of claim 1, wherein the obtaining a record of a proposed range for the temporal parameter related to the entity comprises at least one of:
utilizing, by the one or more processor, a communications connection to access data related to operating hours available on a web site; or
utilizing, by the one or more processor, a communications connection to access and analyze content on a social network.

4. The method of claim 1, wherein the external data related to the entity comprises one or more social network postings by the given user executing the natural language processing algorithms comprises performing sentiment analysis on the one or more social network postings by the given user.

5. The method of claim 1, wherein the variety of data sources further comprises at least one of: a web site, a social channel, a status message, or an email newsletters.

6. The method of claim 1, where the external data related to the given user comprises at least one of: social network postings by the given user, or data relating to prior visits of the given user to the entity or to a similar entity.

7. A computer program product comprising:
a computer readable storage medium readable by one or more processor and storing instructions for execution by the one or more processor for performing a method comprising:
determining, by one or more processor, in a dynamic temporal timeframe, based on to obtaining an inquiry from a remote computing device of a given user, a recommendation for a user customized time for the given user to visit an entity, a corrected range of business hours for the entity, and peak hours of the entity, the determining comprising:

providing, by one or more processor, a graphical user interface on the remote computing device for entry of a request related to an entity with a temporal parameter and data related to a given user, wherein the given user is a user utilizing the remote computing device via the graphical user interface;

obtaining, by the one or more processor, over an Internet connection, from the remote computing device via the entry in the graphical user interface, the request related to the entity, wherein the request comprised the inquiry, and the data related to the given user, wherein the data related to the given user indicates personal preferences of the given user;

transmitting, over a network communication channel to at least one computer resource of in a multi-user environment communicating with the one or more processor over an Internet connection, at least one query related to the temporal parameter of the entity, wherein the multi-user environment comprises at least one node of a cloud computing system;

responsive to the at least one query, obtaining, by the one or more processor, from a variety of data sources remote from the entity accessible to the least one computer resource, based on the remote computing device sharing the at least one computer resource with other mobile devices in the a multi-user environment, accessible to the remote computing device and the other mobile devices over the Internet, the variety of data sources comprising at least one social networking web site, external data related to the temporal parameter of the entity, and based on the data related to the given user, external data related to the given user, wherein the external data related to the entity further comprises global positioning system data gathered from the other mobile devices utilizing services of the cloud computing system and uploaded to a cloud-based server accessible in the cloud computing system to the one or more processor;

obtaining, by the one or more processor, from a memory resource communicatively coupled to the one or more processor, a record of a proposed range for the temporal parameter related to the entity, wherein the proposed range comprises operating hours for the entity;

executing, by the one or more processor, on the external data related to the entity, natural language processing algorithms, based on machine learning, to analyze the external data related to the entity, wherein the executing comprises analyzing trends in the global positioning system data, and based on the natural language processing algorithms, inferring data points from the external data related to the entity that are both consistent and inconsistent with the proposed range;

based on inferring at least one data point that is inconsistent with the proposed range, generating, by the one or more processor, a corrected value comprising operating hours by adjusting the proposed range to include the one or more data points, and replacing the proposed range for the entity in the memory resource with the corrected range;

analyzing, by the one or more processor, the data points related to the entity to generate a prediction for peak hours of the entity;

executing, by the one or more processor, on the external data related to the given user, natural language processing algorithms, based on machine learning, to infer data related to past behaviors of the given user relevant to the given user visiting the entity and determining, based on the inferred data, the corrected range, the prediction for peak hours, and the recommendation for the user customized time for the given user to visit the entity, wherein the corrected range comprises the user customized time and the user customized time is less than the corrected range, wherein the user customized time is customized to the given user based in part on historical preferences of the given user, wherein the external data related to the entity comprises historical data related to the given user, and wherein the historical preferences of the given user are determined based on the executing the natural language processing algorithms on the external data related to the entity;

transmitting, by the one or more processor, over an Internet connection, to the given user via the remote computing device, the recommendation, the corrected range, and the peak hours; and displaying, the recommendation, the corrected range, and the peak hours, in the graphical user interface.

8. The computer program product of claim 7, wherein the obtaining external data related to temporal parameter of the entity comprises:

obtaining and analyzing digital crowd-sourced data accessible to the one or more processor over a communications connection.

9. The computer program product of claim 7, wherein the obtaining a record of a proposed range for the temporal parameter related to the entity comprises at least one of:

utilizing, by the one or more processor, a communications connection to access data related to operating hours available on a web site; or utilizing, by the one or more processor, a communications connection to access and analyze content on a social network.

10. The computer program product of claim 7, wherein the external data related to the entity comprises one or more social network postings by the given user and executing the natural language processing algorithms comprises performing sentiment analysis on the one or more social network postings by the given user.

11. The computer program product of claim 1, wherein the variety of data sources further comprises at least one of: a web site, a social channel, a status message, or an email newsletters.

12. A system comprising:

a memory;

one or more processor in communication with the memory; and program instructions executable by the one or more processor via the memory to perform a method, the method comprising:

determining, by one or more processor, in a dynamic temporal timeframe, based on to obtaining an inquiry from a remote computing device of a given user, a recommendation for a user customized time for the given user to visit an entity, a corrected range of business hours for the entity, and peak hours of the entity, the determining comprising:

providing, by one or more processor, a graphical user interface on the remote computing device for entry of a request related to an entity with a temporal parameter and data related to a given user, wherein the given user is a user utilizing the remote computing device via the graphical user interface;

obtaining, by the one or more processor, over an Internet connection, from the remote computing device via the entry in the graphical user interface, the request related to the entity, wherein the request comprised the inquiry, and the data related to the given user, wherein the data related to the given user indicates personal preferences of the given user;

transmitting, over a network communication channel to at least one computer resource of in a multi-user environment communicating with the one or more processor over an Internet connection, at least one query related to the temporal parameter of the entity, wherein the multi-user environment comprises at least one node of a cloud computing system;

responsive to the at least one query, obtaining, by the one or more processor, from a variety of data sources remote from the entity accessible to the least one computer resource, based on the remote computing device sharing the at least one computer resource with other mobile devices in the a multi-user environment, accessible to the remote computing device and the other mobile devices over the Internet, the variety of data sources comprising at least one social networking web site, external data related to the temporal parameter of the entity, and based on the data related to the given user, external data related to the given user, wherein the external data related to the entity further comprises global positioning system data gathered from the other mobile devices utilizing services of the cloud computing system and uploaded to a cloud-based server accessible in the cloud computing system to the one or more processor;

obtaining, by the one or more processor, from a memory resource communicatively coupled to the one or more processor, a record of a proposed range for the temporal parameter related to the entity, wherein the proposed range comprises operating hours for the entity;

executing, by the one or more processor, on the external data related to the entity, natural language processing algorithms, based on machine learning, to analyze the external data related to the entity, wherein the executing comprises analyzing trends in the global positioning system data, and based on the natural language processing algorithms, inferring data points from the external data related to the entity that are both consistent and inconsistent with the proposed range;

based on inferring at least one data point that is inconsistent with the proposed range, generating, by the one or more processor, a corrected value comprising operating hours by adjusting the proposed range to include the one or more data points, and replacing the proposed range for the entity in the memory resource with the corrected range;

analyzing, by the one or more processor, the data points related to the entity to generate a prediction for peak hours of the entity;

executing, by the one or more processor, on the external data related to the given user, natural language processing algorithms, based on machine learning, to infer data related to past behaviors of the given user relevant to the given user visiting the entity and determining, based on the inferred data, the corrected range, the prediction for peak hours, and the recommendation for the user customized time for the given user to visit the entity, wherein the corrected range comprises the user customized time and the user customized time is less than the corrected range, wherein the user customized time is customized to the given user based in part on historical preferences of the given user, wherein the external data related to the entity comprises historical data related to the given user, and wherein the historical preferences of the given user are determined based on the executing the natural language processing algorithms on the external data related to the entity;

transmitting, by the one or more processor, over an Internet connection, to the given user via the remote computing device, the recommendation, the corrected range, and the peak hours; and displaying, the recommendation, the corrected range, and the peak hours, in the graphical user interface.

13. The system of claim 12, wherein the obtaining external data related to temporal parameter of the entity comprises:

obtaining and analyzing digital crowd-sourced data accessible to the one or more processor over a communications connection.

14. The system of claim 12, wherein the obtaining a record of a proposed range for the temporal parameter related to the entity comprises at least one of:

utilizing, by the one or more processor, a communications connection to access data related to operating hours available on a web site; or utilizing, by the one or more processor, a communications connection to access and analyze content on a social network.

15. The system of claim 12, wherein the external data related to the entity comprises one or more social network postings by the given user and executing the natural language processing algorithms comprises performing sentiment analysis on the one or more social network postings by the given user.

16. The system of claim 12, wherein the variety of data sources further comprises at least one of: a web site, a social channel, a status message, or an email newsletters.

17. The system of claim 12, wherein the external data related to the given user comprises at least one of: social network postings by the given user, or data relating to prior visits of the given user to the entity or to a similar entity.

* * * * *